United States Patent
Chen

(10) Patent No.: US 9,169,450 B2
(45) Date of Patent: Oct. 27, 2015

(54) METHOD OF UPGRADING HEAVY HYDROCARBON STREAMS TO JET AND DIESEL PRODUCTS

(75) Inventor: Cong-Yan Chen, Kensington, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 11/864,540

(22) Filed: Feb. 12, 2008

(65) Prior Publication Data

US 2009/0200201 A1  Aug. 13, 2009

(51) Int. Cl.

| | |
|---|---|
| *C10G 65/08* | (2006.01) |
| *C10G 65/12* | (2006.01) |
| *C10G 65/04* | (2006.01) |
| *C10L 1/08* | (2006.01) |
| *B01J 23/44* | (2006.01) |
| *B01J 23/883* | (2006.01) |
| *B01J 29/74* | (2006.01) |

(52) U.S. Cl.
CPC .............. *C10G 65/08* (2013.01); *C10G 65/043* (2013.01); *C10G 65/12* (2013.01); *C10L 1/08* (2013.01); *B01J 23/44* (2013.01); *B01J 23/883* (2013.01); *B01J 29/74* (2013.01); *C10G 2400/04* (2013.01); *C10G 2400/08* (2013.01)

(58) Field of Classification Search
CPC ....... C10G 65/043; C10G 65/08; C10G 65/12
USPC .............................. 208/57, 108, 111.3, 111.35
See application file for complete search history.

(56) References Cited

U.S. PATENT DOCUMENTS

| | | | |
|---|---|---|---|
| 3,673,078 | A | 6/1972 | Kirk, Jr. et al. |
| 4,162,961 | A | 7/1979 | Marmo |
| 4,310,440 | A | 1/1982 | Wilson et al. |
| 4,347,121 | A | 8/1982 | Mayer et al. |
| 4,440,871 | A | 4/1984 | Lok et al. |
| 4,500,651 | A | 2/1985 | Lok et al. |
| 4,544,143 | A | 10/1985 | Cooper et al. |
| 4,567,029 | A | 1/1986 | Wilson et al. |
| 4,619,759 | A | 10/1986 | Myers et al. |
| 4,686,093 | A | 8/1987 | Flanigen et al. |
| 4,810,357 | A | 3/1989 | Chester et al. |
| 4,851,109 | A | 7/1989 | Chen et al. |
| 4,861,743 | A | 8/1989 | Flank et al. |
| 4,875,992 | A * | 10/1989 | Hamner .................. 208/89 |
| 4,921,594 | A | 5/1990 | Miller |
| 4,968,402 | A | 11/1990 | Kirker et al. |
| 4,973,785 | A | 11/1990 | Lok et al. |
| 5,000,839 | A * | 3/1991 | Kirker et al. .............. 208/89 |
| 5,158,665 | A | 10/1992 | Miller |
| 5,219,814 | A | 6/1993 | Kirker et al. |
| 5,282,958 | A | 2/1994 | Santilli et al. |

(Continued)

OTHER PUBLICATIONS

J.R. Anderson, Reaction on ZSM-5-Type Zeolite Catalysts, Journal of Catalysis, (1979), pp. 114-130, vol. 58, CSIRO Division of Materials Science, Catalysis Science Laboratory, University of Melbourne, Parkville, Victoria 3052, Australia.

(Continued)

*Primary Examiner* — Renee E Robinson
(74) *Attorney, Agent, or Firm* — Josetta I. Jones; M. Carmen & Associates, PLLC

(57) ABSTRACT

The present invention is directed to a process for converting heavy hydrocarbonaceous feeds to jet and diesel products: using a single reactor, dual catalyst system; or using a single reactor, multiple catalyst system.

9 Claims, 3 Drawing Sheets

(56) References Cited

U.S. PATENT DOCUMENTS

| | | |
|---|---|---|
| 5,520,799 A | 5/1996 | Brown et al. |
| 5,868,921 A | 2/1999 | Barre et al. |
| 6,444,865 B1 | 9/2002 | Barre et al. |
| 6,596,156 B1 | 7/2003 | Zhang et al. |
| 6,821,412 B1 | 11/2004 | Fujukawa et al. |
| 7,005,057 B1 | 2/2006 | Kalnes |
| 2005/0269245 A1 | 12/2005 | Huve et al. |
| 2007/0131582 A1 | 6/2007 | Lai et al. |

OTHER PUBLICATIONS

Donald W. Breck, Zeolite Molecular Sieves (Hardcover), Jan. 1974, Capter 8, John Wiley & Sons Inc.

* cited by examiner

METHOD OF UPGRADING HEAVY HYDROCARBON STREAMS TO JET AND DIESEL PRODUCTS

FIELD OF THE INVENTION

The present invention relates to a hydroconversion process, wherein a hydrocarbon feed comprises aromatic compounds that are contacted with hydrogen in the presence of a catalyst composition. Specifically, the present invention is directed to a process for converting heavy hydrocarbonaceous feeds to jet and diesel products using a single reactor, dual catalyst system; or using a single reactor, multiple catalyst system.

BACKGROUND OF THE INVENTION

Heavy hydrocarbon streams, such as FCC Light Cycle Oil ("LCO"), Medium Cycle Oil ("MCO"), and Heavy Cycle Oil ("HCO"), have a relatively low value. Typically, such hydrocarbon streams are upgraded through hydroconversion including hydrotreating and/or hydrocracking.

Hydrotreating catalysts are well known in the art. Conventional hydrotreating catalysts comprise at least one Group VIII metal component and/or at least one Group VIB metal component supported on a refractory oxide support. The Group VIII metal component is typically based on a non-noble metal, such as nickel (Ni) and/or cobalt (Co). Group VIB metal components include those based, on molybdenum (Mo) and tungsten (W). The most commonly applied refractory oxide support materials are inorganic oxides such as silica, alumina and silica-alumina. Examples of conventional hydrotreating catalyst are NiMo/alumina, CoMo/alumina and NiW/silica-alumina. In some cases, platinum and/or palladium containing catalysts may be employed.

Hydrotreating catalysts are normally used in processes wherein a hydrocarbon feed is contacted with hydrogen to reduce its content of aromatic compounds, sulfur compounds, and/or nitrogen compounds. Typically, hydrotreating processes wherein reduction of the aromatics content is the main purpose are referred to as hydrogenation or hydrofinishing processes, while processes predominantly focusing on reducing sulfur and/or nitrogen content are referred to as hydrodesulfurization and hydrodenitrogenation, respectively. Traditionally, the term "hydrotreating" is used to describe hydrodesulfurization and hydrodenitrogenation while the term "hydrofinishing" is used to describe the hydrogenation of aromatics. The present invention follows this tradition of terminologies. Typically, hydrocracking converts feed to lighter products such as naphtha or gas via cracking and dealkylation as well as to low volumetric energy density components via unselective ring opening. One disadvantage of hydrocracking is that it leads to a higher H2 consumption due to cracking, dealkylation and unselective ring opening. The present invention avoids these disadvantages while producing jet/diesel products which not only meet the requirements of the specifications but also possess high volumetric energy density.

The present invention is directed to a method of upgrading heavy hydrocarbon feedstocks with hydrotreating and hydrofinishing catalysts in one single reactor. The present invention is also directed to a method of upgrading heavy hydrocarbon feedstocks with hydrotreating, hydrofinishing and hydroisomerization catalysts in two reactors. The present invention is also directed to a method of upgrading heavy hydrocarbon feedstocks using hydrotreating, hydrofinishing and hydroisomerization catalysts in one single reactor. Specifically, the method of the present invention is directed to a method of upgrading heavy hydrocarbon feedstocks to either jet and/or diesel products with high volumetric energy density.

DESCRIPTION OF THE RELATED ART

Marmo, U.S. Pat. No. 4,162,961 discloses a cycle oil that is hydrogenated under conditions such that the product of the hydrogenation process can be fractionated.

Myers et al., U.S. Pat. No. 4,619,759 discloses the catalytic hydrotreating of a mixture comprising a resid and a light cycle oil that is carried out in a multiple catalyst bed in which the portion of the catalyst bed with which the feedstock is first contacted contains a catalyst which comprises alumina, cobalt, and molybdenum and the second portion of the catalyst bed through which the feedstock is passed after passing through the first portion contains a catalyst comprising alumina to which molybdenum and nickel have been added.

Kirker et al., U.S. Pat. No. 5,219,814 discloses a moderate pressure hydrocracking process in which highly aromatic, substantially dealkylated feedstock is processed to high octane gasoline and low sulfur distillate by hydrocracking over a catalyst, preferably comprising ultrastable Y and Group VIII metal and a Group VI metal, in which the amount of the Group VIII metal content is incorporated at specified proportion to the framework aluminum content of the ultrastable Y component.

Kalnes, U.S. Pat. No. 7,005,057 discloses a catalytic hydrocracking process for the production of ultra low sulfur diesel wherein a hydrocarbonaceous feedstock is hydrocracked at elevated temperature and pressure to obtain conversion to diesel boiling range hydrocarbons.

Barre et al., U.S. Pat. No. 6,444,865 discloses a catalyst, which comprises from 0.1 to 15 wt. % of noble metal selected from one or more of platinum, palladium, and iridium, from 2 to 40 wt. % of manganese and/or rhenium supported on an acidic carrier, used in a process wherein a hydrocarbon feedstock comprising aromatic compounds is contacted with the catalyst at elevated temperature in the presence of hydrogen.

Barre et al., U.S. Pat. No. 5,868,921 discloses a hydrocarbon distillate fraction that is hydrotreated in a single stage by passing the distillate fraction downwardly over a stacked bed of two hydrotreating catalysts.

Fujukawa et al., U.S. Pat. No. 6,821,412 discloses a catalyst for hydrotreating of gas oil containing defined amounts of platinum, palladium and in support of an inorganic oxide containing a crystalline alumina having a crystallite diameter of 20 to 40 Å. Also disclosed is a method for hydrotreating gas oil containing an aromatic compound in the presence of the above catalyst at defined conditions.

Kirker et al., U.S. Pat. No. 4,968,402 discloses a one stage process for producing high octane gasoline from a highly aromatic hydrocarbon feedstock.

Brown et al., U.S. Pat. No. 5,520,799 discloses a process for upgrading distillate feeds. Hydroprocessing catalyst is placed in a reaction zone, which is usually a fixed bed reactor under reactive conditions and low aromatic diesel and jet fuel are produced.

SUMMARY OF THE INVENTION

In one embodiment, the present invention is directed to a process of upgrading heavy hydrocarbons comprising:
  (a) reacting a heavy hydrocarbon feedstream with at least two catalysts in the presence of hydrogen in a fixed bed reactor;

(b) wherein the fixed bed reactor comprises two reaction zones;
(c) wherein the first reaction zone comprises a hydrotreating catalyst;
(d) wherein the heavy hydrocarbon feedstream is fed to the first reaction zone, thereby producing a first reaction product;
(e) wherein the second reaction zone comprises a hydrofinishing catalyst; and
(f) wherein the first reaction product is fed to the second reaction zone, thereby producing a second reaction product.

In another embodiment, the present invention relates to a process of upgrading heavy hydrocarbons comprising:
(a) in a first reactor, reacting a heavy hydrocarbon feedstream with a first catalyst comprising a hydrotreating catalyst in the presence of hydrogen, thereby producing a first reaction product;
(b) reacting the first reaction product of step (a) with a second catalyst system in a second reactor, thereby producing a second reaction product; and
(c) wherein the second reactor is a fixed bed reactor that comprises at least two reaction zones wherein the first reaction zone comprises a hydrofinishing catalyst and wherein the second reaction zone comprises a hydroisomerization catalyst.

In another embodiments the present invention relates to a process of upgrading a heavy hydrocarbon feedstream comprising
(a) combining a hydrotreating catalyst, a hydrofinishing catalyst and a hydroisomerization catalyst in one single reactor; and
(b) passing the heavy hydrocarbon feedstream over the catalysts, thereby producing an upgraded reaction product.

DETAILED DESCRIPTION OF THE INVENTION

While the invention is susceptible to various modifications and alternative forms, specific embodiments thereof are herein described in detail. It should be understood, however, that the description herein of specific embodiments is not intended to limit the invention to the particular forms disclosed, but on the contrary, the intention is to cover all modifications, equivalents, and alternatives falling within the spirit arid scope of the invention as defined by the appended claims.

Definitions

FCC—refers to fluid catalytic cracking.

Heavy hydrocarbon feed—refers to hydrocarbonaceous feeds having a boiling point range of from about 300° F. to about 1000° F.

Energy density—refers to the heat of combustion of a fuel, which is released during its combustion. The amount of heat released depends on whether the water formed during combustion remains in the vapor phase or is condensed to a liquid. If the water is condensed to the liquid phase, it gives up its heat of vaporization in the process. In this case, the released heat is called grossheatofcombustion. The netheatofcombustion is lower than the gross heat of combustion because the water remains in the gaseous phase (water vapor). The net heat of combustion is the appropriate value for comparing fuels since engines exhaust water as vapor. The net volumetric energy density describes the net energy density of a fuel on the volumetric basis and is often given in Btu per gallon, for example, 125,000 Btu per gallon for a jet fuel and 130,000 Btu per gallon for a diesel.

LHSV—refers to liquid hourly space velocity, which is the volume rate of the liquid feed (the volume of the liquid feed at 60° F. per hour) divided by the volume of the catalyst, and is given in $hr^{-1}$.

A. Overview

One embodiment of the present invention relates to a process of upgrading heavy hydrocarbon feedstocks by combining hydrotreating and hydrofinishing catalysts in one single reactor, having two reaction zones, and passing the heavy hydrocarbon feedstock over the catalysts.

Another embodiment of the present invention relates to a process of upgrading heavy hydrocarbon feedstocks by the following method, (a) in a first reactor, passing the heavy hydrocarbon feedstock over hydrotreating catalysts and, (b) in a second reactor, passing the reaction product of (a) over a combination of hydrofinishing and hydroisomerization catalysts.

Another embodiment of the present invention relates to a process of upgrading heavy hydrocarbon feedstocks by combining hydrotreating, hydrofinishing and hydroisomerization catalysts in one single reactor and passing the heavy hydrocarbon feedstock over the catalysts. Preferably, the catalysts are in the order of hydrotreating followed by hydrofinishing and followed by hydroisomerization.

Figure 1:
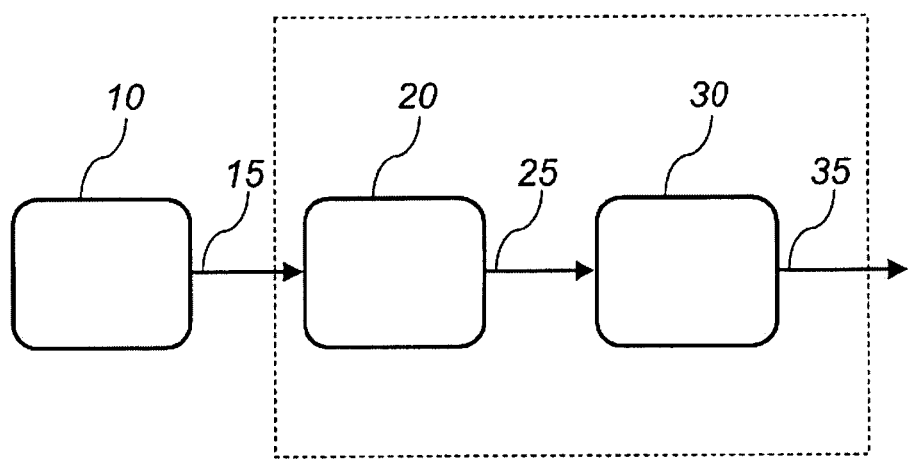
FIGS. 1, 2 and 3 disclose schematic flow diagrams representing preferred embodiments of the present invention.
Figure 2:
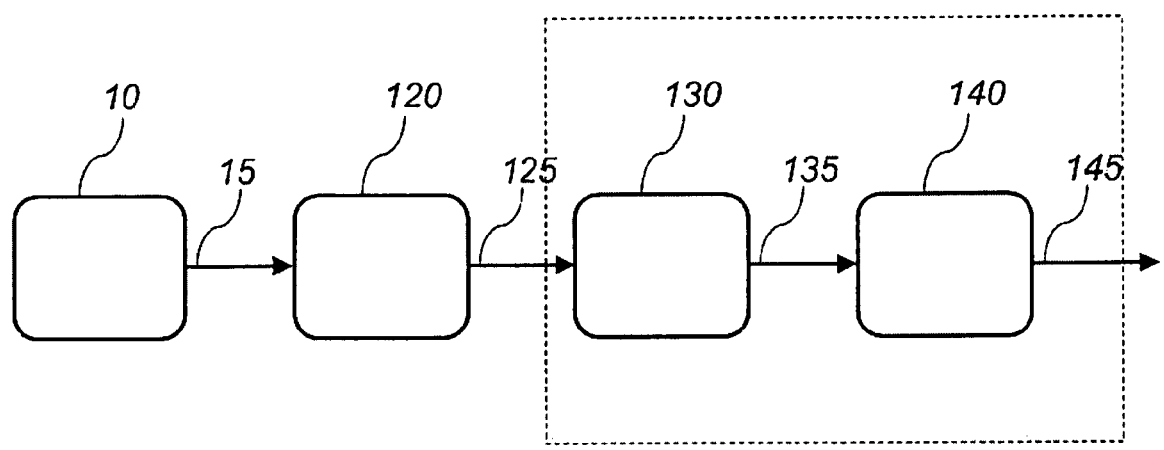
Figure 3:
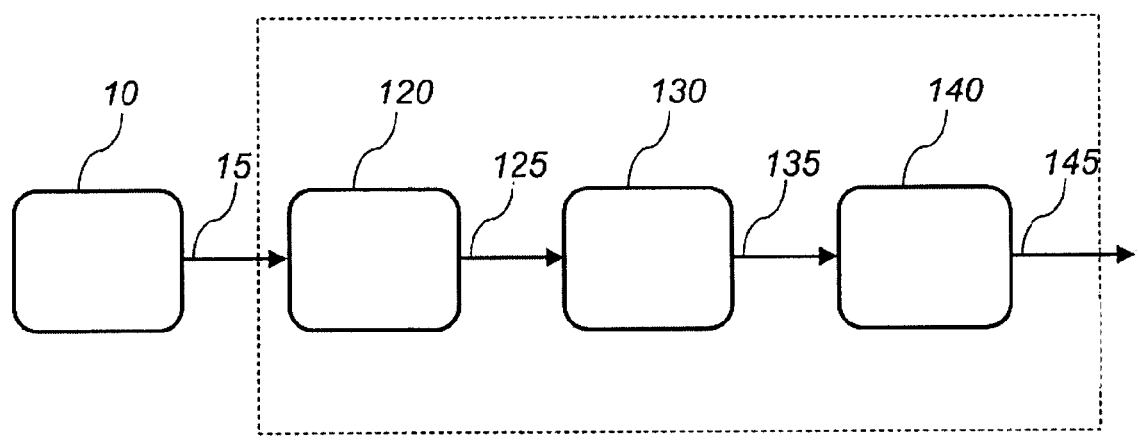

Particular embodiments are described generally with reference to FIGS. 1, 2 and 3. In the embodiment shown in FIG. 1, FCC LCO stream 15 is passed from FCC unit 10 to hydrotreating zone 20 for removal of sulfur and nitrogen compounds. The product stream 25 from hydrotreating zone 20 is then passed to hydrofinishing zone 30. The product stream 35 comprising high volumetric energy density jet and/or diesel is recovered from hydrofinishing zone 30. If necessary, product stream 35 is passed to a distillation column to separate jet and/or diesel from other products such as naphtha or heavier compounds. In this embodiment, both hydrotreating zone 20 and hydrofinishing zone 30 are integrated in a single reactor, as depicted with the box of the dashed lines in FIG. 1.

In the embodiment shown in FIG. 2, FCC LCO stream 15 is passed from FCC unit 10 to hydrotreating zone 120 for removal of sulfur and nitrogen compounds. The product stream 125 from hydrotreating zone 120 is then passed to hydrofinishing zone 130. The product stream 135 from hydrofinishing zone 130 is further passed to hydroisomerization zone 140. The product stream 145 comprising high volumetric energy density jet and/or diesel with improved low temperature properties (e.g., improved freezing point or cloud point) is recovered from hydroisomerization zone 140. If necessary product stream 145 is passed to a distillation column to separate jet and/or diesel from other products such as naphtha or heavier. In this embodiment, both hydrofinishing zone 130 and hydroisomerization zone 140 are integrated in a single reactor, as depicted with the box of the dashed lines in FIG. 2.

Another embodiments is shown in FIG. 3. It is the same as shown in FIG. 2, 20 except that the hydrotreating zone 120, hydrofinishing zone 130 and hydroisomerization zone 140 are integrated into a single reactor, as depicted with the box of the dashed lines in FIG. 3.

B. Feed

Heavy hydrocarbon feedstock may be upgraded to a product having a boiling point range within jet and/or diesel boiling point ranges. The hydrocarbon feedstock comprises FCC effluent, including FCC light, medium and heavy cycle oil; fractions of jet and diesel fuels; coker product; coal liquefied oil; the product from the heavy oil thermal cracking process; the product from heavy oil hydrotreating and/or hydrocracking; straight run cut from a crude unit; or mixtures thereof, and having a major portion of the feedstock having a boiling range of from about 250° F. to about 1200° F., and preferably from about 300° F. to about 1000° F. The term "major portion" as used in this specification and the appended claims, shall mean at least 50 wt. %.

Typically, the feedstock may comprise at least 20 wt. % ring-contaiining hydrocarbon compounds comprising aromatic moieties, naphthenic moieties or both, up to 3 wt % sulfur and up to 1 wt % nitrogen, Preferably, the feedstock may comprise at least 40 wt % ring-containing hydrocarbon compounds. More preferred, the feedstock may comprise at least 60 wt % ring-containing hydrocarbon compounds. Typically, the cetane number of the feed is about 20.

C. Hydrotreating Catalyst

Hydrotreating is typically conducted at 400-900° F., 100-3000 psig, a hydrocarbon feed LHSV (Liquid Hourly Space Velocity) of 0.1-10 $hr^{-1}$, and a hydrogen rate of about 400 to 10,000 SCF/bbl.

Hydrotreating catalysts are suitable for hydroconversion of feedstocks containing high amounts of sulfur, nitrogen and/or aromatic-containing molecules. Such catalysts generally contain at least one metal component selected from Group VIII (CAS Notation) and/or at least one metal components selected from the Group VI B (CAS notation) elements. Group VIB elements include chromium, molybdenum and tungsten. Group VIII elements include iron, cobalt and nickel. The noble metals, especially palladium and/or platinum, may be included, alone or in combination with other elements, in the hydrotreating catalyst. The amount(s) of metal component(s) in the catalyst suitably range from about 0.5% to about 25% by weight of Group VIII metal component(s) and from about 0.5% to about 2:5% by weight of Group VIB metal comrponent(s), calculated as metal oxide(s) per 100 parts by weight of total catalyst, where the percentages by weight are based on the weight of the catalyst before sulfiding. The metal components in the catalyst may be in the oxidic and/or the sulphidic form. If a combination of at least a Group VI B and a Group VIII metal component is present as (mixed) oxides, it may be subjected to a sulfiding treatment prior to proper use in hydrotreating. Suitably, the catalyst comprises one or more components of nickel and/or cobalt and one or more components of molybdenum and/or tungsten.

The hydrotreating catalyst particles of this invention are suitably prepared by blending, or co-mulling, active sources of the aforementioned metals with a binder. Examples of suitable binders include silica, alumina, clays, zirconia, titania, magnesia and silica-alumina. Preference is given to the use of alumina as binder. Other components, such as phosphorous, may be added as desired to tailor the catalyst particles for a desired application. The blended components are then shaped, such as by extrusion, dried and calcined at temperatures up to 1200° F. (649° C.) to produce the finished catalyst particles. Alternative, equally suitable methods of preparing the amorphous catalyst particles include preparing oxide binder particles, such as by extrusion, drying and calcining, followed by depositing the aforementioned metals on the oxide particles, using methods such as impregnation. The catalyst particles, containing the aforementioned metals, are then further dried and calcined prior to use as a hydrotreating catalyst.

Suitable hydrotreating catalysts generally comprise a metal component, suitably Group VIB or VIII metal, for example cobalt-molybdenum, nickel-molybdenum, on a porous support, for example silica-alumina or alumina. Examples of suitable hydrotreating catalysts are the commercial ICR 106, ICR 120 of Chevron Research and Technology Co.; DN-200 of Criterion Catalyst Co., TK-555 and TK-565 of Haldor Topsoe A/S; HC-K, HC-P, HC-R and HC-T of UOP; KF-742, KF-752, KF-846, KF-848 STARS and KF-849 of AKZO Nobel/Nippon Ketjen; and HR-438/448 of Procatalyse SA.

Catalysts used in carrying out hydrotreating operations are well known in the art. See, for example, U.S. Pat. Nos. 4,3: 47,121 and 4,810,357 for general descriptions of hydrotreating, and typical catalysts used in hydrotreating processes.

The hydrotreating catalyst employed in the present invention is selected from the group consisting of a nickel-molybdenum catalyst, a nickel-tungsten catalyst, a molybdenum-tungsten catalyst, a nickel-molybdenum-tungsten catalyst and a molybdenum-cobalt catalyst D. Hydrofinishing Catalyst It is often desirable to use hydrogenation (sometimes referred to as hydrofinishing) to saturate the unsaturated hydrocarbons such as aromatics olefins and diolefins, for example, to produce more stable products. Hydrofinishing is typically conducted at temperatures ranging from about 300° F. to about 800° F. at pressures from about 100 psig to about 3000 psig at space velocities (LHSV) between about 0.1 and 10 $hr^{-1}$ and a hydrogen rate of about 400 to 10,000 SCF/bbl. The hydrogenation catalyst (i.e., hydrofinishing catalyst) employed must be active enough not only to hydrogenate the olefins, diolefins and color bodies which may be present, but also to reduce the aromatic content. Suitable hydrogenation catalysts are disclosed in U.S. Pat. No. 4,921,694 issued May 1, 1990 to Stephen Miller, which is incorporated by reference herein in its entirety. The hydrofinishing catalyst employed in the present invention is selected from a group consisting of a nickel catalyst, a platinum-palladium catalyst, a platinum catalyst, and a palladium catalyst. Preferably, the hydrofinishing catalyst comprises platinum and palladium on a mixed silica-alumina/alumina base.

E. Hydroisomerization Catalyst

The catalytic hydroisomerization conditions employed depend on the feed used for the hydroisomerization and the desired low temperature properties of the product. Hydroisomerization processes are typically carried out at a temperature between 200° F. and 900° F., preferably 300° F. to 800° F., more preferably 400° F. to 800° F. with a liquid hourly space velocity between 0.1 and 10 $hr^{-1}$, preferably between 0.25 and 5 $hr^{-1}$, and more preferably 0.4 to 4 $hr^{-1}$. The pressure is typically from about 15 psig to about 3000 psig, preferably from about 50 psig to about 2500 psig. The hydrogen to feed ratio is typically from about 100 to about 30,000 SCF/bbl (standard cubic feet hydrogen per barrel feed), preferably from about 200 to about 20,000 SCF/bbl, more preferably from about 400 to 10,000 SCF/bbl. Catalysts useful for hydroisomerization processes are generally bifunctional catalysts that include a hydrogenation/dehydrogenation component and acidic component. The hydroisomerization catalyst can comprise a Group VIII metal, preferably platinum or palladium, more preferably platinum, on a porous inorganic oxide support, for example alumina, silica-alumina or a zeolite (i.e., crystalline aluminosilicate). If the support itself does not have sufficient acidity to promote the needed isomerization reactions, such acidity can be added. Examples of an acid component useful in the preferred hydroisomerization catalyst include a zeolite, a halogenated alumina component, or a silica-alumina component. If a halogenated component is desired, then the catalyst may be chlorided. Thus, chlorided alumina is a suitable catalytic support. Various zeolites can be utilized to provide acidity without the necessity for chloriding. If zeolitic components are utilized, it is generally preferred that they not be alkali neutralized. Such paraffin hydroisomerization catalysts are well known in the art.

Suitable hydroisomerization catalysts comprise platinum on chlorided alumina and, platinum on a zeolite which has an acidic function for promoting hydroisomerization. Suitable zeolites include faujasite, mordenite and other synthetic crystalline, aluminosilicate molecular sieves.

Hydroisomerization uses a bifunctional catalyst including an acidic component and a metal component. Typical metal components are platinum or palladium, although platinum is most commonly used. The preferred catalyst contains a molecular sieve and a metal component in an amount sufficient to achieve greater than 10% isomerized hexadecane products, and preferably greater than 40% isomerized hexadecane products, in the test described by Santilli et al. in U.S. Pat. No. 5,282,958, Specific molecular sieves which are useful in the hydroisomerization process of the present invention include the zeolites ZSM-51 ZSM-12, ZSM-21, ZSM-22, ZSM-23, ZSM-35, ZSM-38, ZSM-48, ZSM-57, SSZ-20, SSZ-25, SSZ-32, SSZ-35, SSZ-44, SSZ-45, SSZ-47, SSZ-58, ferrierite and L and other molecular sieve materials based upon crystalline aluminophosphates such as SM-3, SAPO-11, SAPO-31, SAPO-41, MAPO-11 and MAPO-31.

Non-zeolitic molecular sieves are generally taught, for example, in U.S. Pat. No. 4,861,743, the disclosure of which is completely incorporated herein by reference for all purposes. Crystalline aluminophosphate molecular sieves (AlPO4) as described in U.S. Pat. No. 4,310,440. Metalloaluminophophate molecular sieves are described in U.S. Pat. Nos. 4,500,651; 4,567,029; 4,544,143; 4,686,093 and 4,861,743. Nonmetal substituted aluminophosphates are described in U.S. Pat. No. 4,973,785. The preferred non-zeolitic molecular sieve is an intermediate pore silicoaluminophosphate or SAPO. More preferred SAPO's include SAPO-11, SAPO-31 and SAPO-41 U.S. Pat. No. 4,440,871 describes SAPO's generally and SAPO-11, SAPO-31, and SAPO-41 specifically. A still more preferred intermediate pore hydroisomerization silicoaluminophosphate molecular sieve prepared in the present process is SAPO-11. The most preferred intermediate pore SAPO prepared by the present process is SM-3, which has a crystalline structure failing within that of the SAPO-11 molecular sieves. A preparation of SM-3 and its unique characteristics are described in U.S. Pat. No. 5,158,665.

In the present invention, the term "intermediate pore size", as used herein, is meant an effective pore aperture in the range of about 4.0 to about 6.5 Angstroms when the molecular sieve is in the calcined form. The effective pore size of the molecular sieves can be measured using standard adsorption techniques and hydrocarbonaceous compounds of known kinetic diameters See Breck, Zeolite Molecular Sieves, 1974 (especially Chapter 8); Anderson et al., J. Catalysis 58, 114 (1979); and U.S. Pat. No. 4,440,871, all of which are incorporated herein by reference.

Intermediate pore size molecular sieves will typically admit molecules having kinetic diameters of 4.0 to 6.5 Angstroms with little hindrance. Examples of such compounds (and their kinetic diameters in Angstroms) are: n-hexane (4.3), 3-methylpentane (5.5), benzene (5.85), and toluene (5.8). Compounds having kinetic diameters of about 6 to 6.5 Angstroms can be admitted into the pores, depending on the particular sieve, but do not penetrate as quickly and in some cases are effectively excluded. Compounds having kinetic diameters in the range of 6 to 6.5 angstroms include: cyclohexane (6.0), 2,3-dimethylbutane (6.1), and m-xylene (6.1). Generally, compounds having kinetic diameters of greater than about 6.5 Angstroms do not penetrate the pore apertures and thus are not absorbed into the interior of the molecular sieve lattice. Examples of such larger compounds include: o-xylene (6.8), hexamethylbenzene (7.1), and tributylamine (8.1). The preferred effective pore size range is from about 4.0 to about 6.2 Angstroms.

MAPO-5, MAPO-11, MAPO-14, MAPO-34 are described in U.S. Pat. No. 4,567,029. The descriptions of the molecular sieves, and of the preparations thereof, are also incorporated by reference.

Examples of suitable hydroisomerization catalysts is an Isodewaxing® catalyst, which may be purchased from Chevron Corporation.

F. Process Conditions

In one embodiment, the heavy hydrocarbon feedstream is reacted with at least two catalysts in the presence of hydrogen in a fixed bed reactor. Typically the fixed bed reactor comprises at least two reaction zones. The first reaction zone comprises a nickel-molybdenum on alumina catalyst for hydrotreating; and, the second reaction bed comprises a platinum-palladium on alumina catalyst for hydrofinishing. The heavy hydrocarbon feedstream is fed to the first reaction zone, which has a temperature of from about 300° F. to about 800° F., thereby producing a first reaction product. The first reaction product is fed to the second reaction zone, which has a temperature of from about 300° F. to about 800° F., thereby producing a second reaction product.

In another embodiment, the heavy hydrocarbon feedstream is reacted with at least two catalysts in the presence of hydrogen in a fixed bed reactor. The catalysts may be physically premixed prior to addition to the fixed bed or the catalysts may be individually added to the fixed bed reactor and mixed. Such catalysts are, for examples a nickel-molybdenum on alumina catalyst for hydrotreating and a platinum-palladium on alumina catalyst for hydrofinishing.

Typically, the contacting of the hydrocarbon feed with the hydrotreating/hydrofinishing catalysts occurs at pressures ranging from 100 psig to 3000 psig, hydrocarbon feed LHSV (Liquid Hourly Space Velocity) ranging from 0.1 to 10 $hr^{-1}$, and a ratio of hydrogen to hydrocarbon ranging from a bout 400-10,000 SCF/bbl. Where there is only partial conversion of the hydrocarbon feedstock, the process optionally includes a separation stage for recovering at least a portion of the unconverted feedstock. At least a portion of any unconverted feedstock is then, optionally, recycled to the hydrotreating/hydrofinishing reaction unit. In case the catalyst is deactivated by coke deposit or other poisons, the catalyst activity can be rejuvenated via regeneration. Processes which are suitable for regeneration are known to those skilled in the art.

Another embodiment of the present invention comprises upgrading a heavy hydrocarbon feedstream by employing two reactors. Specifically, the process comprises (a) in a first retactor, reacting a heavy hydrocarbon feedstream with a first catalyst comprising nickel and molybdenum for hydrotreating in the presence of hydrogen; (b) reacting the product of step (a) with a second catalyst system in a second fixed bed reactor which comprises at least two reaction zones wherein the first reaction zone comprises a catalyst containing platinum or palladium or mixtures thereof for hydrofinishing and wherein the second reaction zone comprises a hydroisomerization catalyst.

Typically, the contacting of the hydrocarbon feed with the hydrotreating/hydrofinishing catalysts occurs at pressures ranging from 100 psig to 3000 psig, hydrocarbon feed LHSV (Liquid Hourly Space Velocity) ranging from 0.1 to 10 $hr^{-1}$ and a ratio of hydrogen to hydrocarbon ranging from about 400-10,000 SCF/bbl. Where there is only partial conversion of the hydrocarbon feedstock, the process optionally includes a separation stage for recovering at least a portion of the unconverted feedstock. At least a portion of any unconverted feedstock is then, optionally, recycled to the hydrotreating/hydrofinishing reaction unit. In case the catalyst is deactivated by coke deposit or other poisons, the catalyst activity can be rejuvenated via regeneration. Processes which are suitable for regeneration are known to those skilled in the art.

Another embodiment of the present invention comprises upgrading a heavy hydrocarbon feedstream by combining a hydrotreating catalyst, a hydrofinishing catalyst and a hydroisomerization catalyst in a single reactor and passing the heavy hydrocarbon feedstream over the combined catalysts.

Typically, the contacting of the hydrocarbon feed with the hydrotreating/hydrofinishing/hydroisomerization catalysts occurs at pressures ranging from 100 psig to 3000 psig, hydrocarbon feed LHSV (Liquid Hourly Space Velocity) ranging from 0.1 to 10 hr$^{-1}$, and a ratio of hydrogen to hydrocarbon ranging from about 400-10,000 SCF/bbl. Where there is only partial conversion of the hydrocarbon feedstock, the process optionally includes a separation stage for recovering at least a portion of the unconverted feedstock. If deeper hydrotreating is desirable, a portion of the reaction product, which may contain unconverted feedstock, may be, optionally, recycled to the hydrotreating/hydrofinishing/hydroisomerization reaction zone(s). In case the catalyst is deactivated by coke deposit or other poisons, the catalyst activity can be rejuvenated via regeneration. Processes which are suitable for regeneration are known to those skilled in the art.

G. Product

The method employed in the present invention upgrades heavy hydrocarbon feedstocks to either jet and/or diesel products. It has been discovered that the present method employed produces jet and/or diesel products that have a net heat of combustion of greater than at least 125,000 Btu/gal, preferably the net heat of combustion is greater than at least 127,000 Btu/gal, more preferably 128,500 Btu/gal, even more preferably 130,000 Btu/gal and most preferably 132,000 Btu/gal. Furthermore, the product meets the specifications for jet and diesel, respectively. It has been discovered that the employment of hydroisomerization catalysts improves the low temperature properties, such as freezing point, cloud point and the like. Specifically, the product has a freezing point below −40° C. for jet and a cloud point below −9° C. for diesel.

Other embodiments will be obvious to those skilled in the art.

The following examples are presented to illustrate specific embodiments of this invention and are not to be construed in any way as limiting the scope of the invention.

EXAMPLES

Example 1

FCC Cycle Oil Feeds

Table 1 discloses the properties of the feedstocks used in the present invention. These feedstocks are cycle oil products from the Fluid Catalytic Cracking unit in a refinery. The feedstocks were also analyzed with simulated distillation. The results of the simulated distillation are listed in Table 2. The feedstocks have not been hydrotreated.

TABLE 1

Properties of FCC Cycle Oil Feedstocks

| Properties | Feed #1 | Feed #2 | Feed #3 |
|---|---|---|---|
| Density at 20° C. g/cc | 0.9227 | 0.9599 | 0.9488 |
| Smoke Point mm | 5 | 3 | 5 |
| Flash Point ° C. | 85 | 138 | 70 |
| Freezing Point ° C. | −22.1 | −7.7 | −1.3 |
| Cloud Point ° C. | −32.0 | −14.0 | −5.0 |

TABLE 1-continued

Properties of FCC Cycle Oil Feedstocks

| Properties | Feed #1 | Feed #2 | Feed #3 |
|---|---|---|---|
| Viscosity at 40° C. cSt | 1.697 | 5.046 | 3.591 |
| Viscosity at −20° C. cSt | 26.04 | frozen | frozen |
| Net Heat of Combustion Btu/gal | 137,034 | 138,543 | 138,075 |
| Sulfur Content wt ppm | 2280 | 3620 | 5400 |
| Nitrogen Content wt ppm | 232 | >500 | >500 |

TABLE 2

Simulated Distillation of FCC Cycle Oil Feedstocks

| | Temperature ° F. | | |
|---|---|---|---|
| Vol. % | Feed #1 | Feed #2 | Feed #3 |
| 0.5 | 289 | 493 | 238 |
| 5 | 392 | 551 | 393 |
| 10 | 408 | 566 | 436 |
| 20 | 436 | 578 | 477 |
| 30 | 447 | 584 | 502 |
| 40 | 451 | 589 | 534 |
| 50 | 455 | 595 | 562 |
| 60 | 458 | 601 | 593 |
| 70 | 473 | 607 | 623 |
| 80 | 486 | 612 | 652 |
| 90 | 496 | 620 | 689 |
| 95 | 516 | 626 | 716 |
| 99 | 547 | 634 | 764 |
| 99.5 | 562 | 638 | 784 |

Example 2

Catalysts

The following catalysts are used in the invention and are described below.

(1) A hydrotreating catalyst comprising molybdenum and nickel on an alumina base.

(2) A hydrofinishing catalyst comprising platinum and palladium on a mixed silica-alumina/alumina base.

(3) A hydroisomerization catalyst comprising platinum on a mixed SSZ-32 zeolite/alumina base.

Comparative Example 1

Upgrade of FCC Cycle Oil to Jet Fuel Using a Ni—Mo Catalyst

Feed #1, as described in Example 1, was fed at a rate of 11.2 cc/hr to a single reactor. Feed #1 was hydrotreated over 5.9 grams of Ni—Mo catalyst, which is described in Example 2. The reactor temperature was 660° F. and the pressure was 1700 psig. The LHSV was ~2 hr$^{-1}$. Hydrogen rate was 300 cc/min.

The properties of the jet product are listed in Table 3. The product was also analyzed with simulated distillation and the results are listed in Table 4.

The results indicate that the jet product prepared with such a Ni—Mo catalyst does not meet the jet specifications, as demonstrated, for example, by the density and smoke point, although it has a high net heat of combustion of 132,700 Btu/gallon.

TABLE 3

Properties of Jet Fuels Produced in Comparative Example 1 and Example 3

| Properties | Jet Specs | Product from Untreated Cycle Oil Feed #1 Example 1 | Single Reactor Hydroprocessing on Ni—Mo Comparative Example 1 | Product from Hydroprocessing on Ni—Mo and Pt—Pd Example 3 |
|---|---|---|---|---|
| Density at 20° C. g/cc | 0.775-0.840 | 0.9227 | 0.8856 | 0.8375 |
| Smoke Point mm | >18 | 5 | 8 | 27 |
| Flash Point ° C. | >38 | 85 | 80 | 68 |
| Freezing Point ° C. | <−40 | −22.1 | −22.1 | −61.0 |
| Viscosity at −20° C. cSt | <8 | 26.04 | 7.01 | 6.60 |
| Net Heat of Combustion Btu/gal | | 137,034 | 132,700 | 129,032 |
| Sulfur Content ppm wt. | | 2280 | 0.8 | 0.1 |
| Nitrogen Content ppm wt. | | 232 | <0.1 | <0.1 |

TABLE 4

Simulated Distillation of Jet Fuels Produced in Comparative Example 1 and Example 3

| | Temperature ° F. | | |
|---|---|---|---|
| Vol. % | Untreated Cycle Oil Feed #1 Example 1 | Product from Hydroprocessing on Ni—Mo Comparative Example 1 | Product from Single Stage Hydroprocessing on Ni—Mo and Pt—Pd Example 3 |
| 0.5 | 289 | 287 | 269 |
| 5 | 392 | 368 | 342 |
| 10 | 408 | 390 | 365 |
| 20 | 436 | 408 | 388 |
| 30 | 447 | 422 | 391 |
| 40 | 451 | 436 | 396 |
| 50 | 455 | 442 | 406 |
| 60 | 458 | 450 | 416 |
| 70 | 473 | 460 | 430 |
| 80 | 486 | 471 | 451 |
| 90 | 496 | 488 | 475 |
| 95 | 516 | 504 | 491 |
| 99 | 547 | 540 | 531 |
| 99.5 | 562 | 552 | 545 |

Example 3

Upgrade of FCC Cycle Oil to Jet Using Hydrotreating and Hydrofinishing Catalysts in One Single Reactor Feed #1, as described in Example 1, was hydroprocessed at a feed rate of 11.2 cc/hr over a single reactor comprising 5.9 grams of a Ni—Mo hydrotreating catalyst on top of 13.2 grams of platinum/palladium hydrofinishing catalyst, both of which are described in Example 2. The reactor temperature was 660° F. and the pressure was 1700 psig. Hydrogen rate was 300 cc/min.

The properties of the jet product are also listed in Table 3. The reaction product was also analyzed with simulated distillation. The results of the simulated distillation are also listed in Table 4.

The results show the improvement of jet properties using such a hydroprocess which combines Ni—Mo and platinum/palladium catalysts, as demonstrated, for example, by the improved smoke point with a high net heat of combustion of 129,032 Btu/gallon.

Comparative Example 2

Upgrade of FCC Cycle Oil to Diesel Using Hydrotreating Catalyst

Feed #2, as described in Example 1, was hydroprocessed at a feed rate of 2 cc/hr over 0.96 grams of a Ni—Mo hydrotreating catalyst, which is described in Example 2, in a fixed bed reactor. The reactor temperature was 675° F. and the reactor pressure was 1700 psig. Hydrogen feed rate was 100 cc/min.

TABLE 5

Properties of Diesel Produced in Comparative Example 2 and Example 3

| | Diesel Specs | Untreated Cycle Oil Feed #2 Example 1 | Product from Hydroprocessing on Ni—Mo Comparative Example 2 | Product from Single Reactor Hydroprocessing on Ni—Mo and Pt—Pd Example 4 |
|---|---|---|---|---|
| Density at 20° C. g/cc | <0.870 | 0.9599 | 0.9241 | 0.8614 |

TABLE 5-continued

Properties of Diesel Produced in Comparative Example 2 and Example 3

| | Diesel Specs | Untreated Cycle Oil Feed #2 Example 1 | Product from Hydroprocessing on Ni—Mo Comparative Example 2 | Product from Single Reactor Hydroprocessing on Ni—Mo and Pt—Pd Example 4 |
|---|---|---|---|---|
| Flash Point °C. | >52 | 138.3 | 109.4 | 62.2 |
| Cloud Point °C. | <−9 | −14 | −17 | −22 |
| Viscosity at 40° C. cSt | 1.9-3.4 | 5.05 | 4.51 | 2.98 |
| Cetane Index | >40 | 27.4 | 31.4 | 41.5 |
| Net Heat of Combustion, Btu/gal | | 138,642 | 136,959 | 133,085 |
| Sulfur Content wt ppm | | 3620 | 9.5 | 8.7 |
| Nitrogen Content wt ppm | | >500 | 3.9 | 4.3 |

The properties of the diesel product are listed in Table 5. The product was also analyzed with simulated distillation and the results are listed in Table 6.

TABLE 6

Simulated distillation of FCC Cycle Oil Feed and Product

| | Temperature, ° F. | | |
|---|---|---|---|
| Vol. % | Untreated Cycle Oil Feed #2 Example 1 | Product from Hydroprocessing on Ni—Mo Comparative Example 2 | Product from Single Reactor Hydroprocessing on Ni—Mo and Pt—Pd Example 4 |
| 0.5 | 493 | 358 | 180 |
| 5 | 551 | 493 | 278 |
| 10 | 566 | 514 | 361 |
| 20 | 578 | 534 | 463 |
| 30 | 584 | 549 | 493 |
| 40 | 589 | 560 | 508 |
| 50 | 595 | 572 | 523 |
| 60 | 601 | 580 | 538 |
| 70 | 607 | 590 | 562 |
| 80 | 612 | 602 | 586 |
| 90 | 620 | 613 | 606 |
| 95 | 626 | 621 | 619 |
| 99 | 634 | 633 | 635 |
| 99.5 | 638 | 637 | 643 |

The results indicate that the diesel product prepared with such a Ni—Mo catalyst does not meet the diesel specifications, as demonstrated, for example, by the density, viscosity and Cetane Index, although it has a high net heat of combustion of 136,959 Btu/gallon.

Example 4

Upgrade of FCC Cycle Oil to Diesel Using Hydrotreating and Hydrofinishing Catalysts in One Single Reactor Feed #2, as described in Example 1, was hydroprocessed at a feed rate of 2 cc/hr over a layered bed having 0.96 grams of a Ni—Mo hydrotreating catalyst on top of 2.28 grams of a platinum/palladium hydrofinishing catalyst, both of which are described in Example 2, in a single reactor.

The reactor temperature was 675° F. and the reactor pressure was 1700 psig. The LHSV was ~0.5. Hydrogen feed rate was 100 cc/min. The properties of the diesel product are listed in Table 5. The reaction product was also analyzed with simulated distillation. The results of the simulated distillation are listed in Table 6.

The results show the improvement of diesel properties using such a single reactor hydroprocess and employing Ni—Mo and platinum/palladium catalysts, as demonstrated, for example, by the improved Cetane Index with a high net heat of combustion of 133,085 Btu/gallon.

Example 5

Upgrade of FCC Cycle Oil to Diesel with Hydrotreating, Hydrofinishing and Hydroisomerization Catalysts in Two Reactors Feed #3, as described in Example 1, was hydroprocessed in two reactors. In a first reactor, Feed #2 was initially fed at a rate of 11.2 cc/hr over 5.97 grams of a Ni—Mo hydrotreating catalyst, as described in Example 2, thereby producing an intermediate reaction product. The temperature of the first reactor was 660° F., the pressure was 1700 psig and the LHSV was ~2, the hydrogen rate was 300 cc/min. In a second reactor, the intermediate reaction product was fed at a rate of 2 cc/hr over a layered catalyst bed comprising 3.64 grams of platinum/palladium hydrofinishing catalyst on the top layer and 1.13 grams of platinum hydroisomerization catalyst on the bottom layer, both of which catalysts are described in Example 2, thereby producing a final reaction product. The temperature of the second reactor was 600° F. and the pressure was 1000 psig. The LHSV was 0.5. The hydrogen rate was 50 cc/min. The catalytic results are listed in Table 7. The final reaction product was also analyzed using simulated distillation. The results from the simulated distillation are listed in Table 8.

TABLE 7

Reaction Results

|  | Diesel Specs | Untreated Feed #3 Example 1 | Two Reactor Hydroprocessing on Hydrotreating & Hydrofinishing/ Hydroisomerization Catalysts Example 5 | Two Reactor Hydroprocessing on Hydrotreating & Hydrofinishing Catalysts Comparative Example 3 |
|---|---|---|---|---|
| Density at 20° C. g/cc | <0.870 | 0.9488 | 0.8534 | 0.8659 |
| Flash Point ° C. | >52 | 70 | 59 | 72 |
| Cloud Point ° C. | <−9 | −5 | −33 | −9 |
| Cetane Index | >40 | 25.8 | 39.4 | 38.2 |
| Viscosity at 40° C. cSt | 1.9-3.4 | 3.591 | 2.727 | 3.191 |
| Net Heat of Combustion, Btu/gal |  | 138,075 | 131,117 | 132,010 |

TABLE 8

Simulated Distillation of FCC Cycle Oil Feed and Products

Temperature, ° F.

| Vol. % Recovered | Untreated Feed #3 Example 1 | Two Reactor Hydroprocessing on Hydrotreating & Hydrofinishing/ Hydroisomerization Catalysts Example 5 | Two Reactor Hydroprocessing on Hydrotreating & Hydrofinishing Catalysts Comparative Example 3 |
|---|---|---|---|
| 0.5 | 238 | 214 | 252 |
| 5 | 393 | 323 | 360 |
| 10 | 436 | 368 | 387 |
| 20 | 477 | 406 | 419 |
| 30 | 502 | 431 | 450 |
| 40 | 534 | 459 | 478 |
| 50 | 562 | 487 | 506 |
| 60 | 593 | 513 | 530 |
| 70 | 623 | 537 | 556 |
| 80 | 652 | 570 | 594 |
| 90 | 689 | 623 | 646 |
| 95 | 716 | 667 | 689 |
| 99 | 764 | 734 | 751 |
| 99.5 | 784 | 753 | 769 |

Comparative Example 3

Upgrade of LCO to Diesel with Hydrotreating and Hydrofinishing Catalysts in Two Reactors Feed #3, as described in Example 1, was hydroprocessed in two reactors. In a first reactor. Feed #3 was initially fed at a rate of 11.2 cc/hr over 5.97 grams of a Ni—Mo hydrotreating catalyst, as described in Example 2, thereby producing an intermediate reaction product. The temperature of the first reactor was 660° F., the pressure was 1700 psig and the LHSV was ~2, the hydrogen rate was 300 cc/min. In a second reactor, the intermediate reaction product Was fed at a rate of 2 cc/hr over 3.64 grams of a platinum/palladium hydrofinishing catalyst, as described in Example 2, thereby producing a final reaction product. The temperature of the second reactor was 600° F. and the pressure was 1000 psig. The hydrogen rate was 50 cc/mm. The catalytic results are listed in Table 7. The final reaction product was also analyzed using simulated distillation. The results from the simulated distillation are listed in Table 8.

The results are compared to those obtained from Example 5 where the same feed was hydroprocessed in two stages as well as with a hydroisomerization catalyst which was added to the second reactor: (1) first over Ni—Mo hydrotreating catalyst and (2) then over a layered bed consisting of a platinum/palladium hydrofinishing catalyst and a platinum hydroisomerization catalyst, all of which are described in Example 2. The effects of employing a hydroisomerization catalyst may be seen by comparing the results from Example 5 and Comparative Example 3. Employing a hydroisomerization catalyst results in the isomerization of normal paraffinic components to iso-paraffinic components, resulting in improving the low-temperature properties (e.g., lower cloud point, etc.).

What is claimed is:

1. A process of upgrading a heavy aromatic-containing hydrocarbon feedstream to a hydrocarbon product having a boiling range within a jet boiling range, the process comprising
   (a) combining a hydrotreating catalyst, a hydrofinishing catalyst and a hydroisomerization catalyst in one single reactor; and
   (b) passing the heavy aromatic-containing hydrocarbon feedstream, having a nitrogen content of greater than 232 ppmw, sequentially over the hydrotreating, hydrofinishing, and hydroisomerization catalysts, thereby producing an upgraded reaction product, wherein the upgraded reaction product is a hydrocarbon product having a boiling range within a jet boiling range and having a net heat of combustion of greater than at least 127,000 Btu/gal, and a freezing point below −40° C., and further wherein the hydrocarbon product meets jet fuel specifications.

2. The process of claim 1 wherein the hydrotreating catalyst is selected from a group consisting of a nickel-molybdenum catalyst, a nickel-tungsten catalyst, a molybdenum-tungsten catalyst, a nickel-molybdenum-tungsten catalyst, and a molybdenum-cobalt catalyst.

3. The process of claim 1 wherein the hydro finishing catalyst is selected from the group consisting of a nickel catalyst, a platinum-palladium catalyst, a platinum catalyst, and a palladium catalyst.

4. The process of claim 1 wherein the feedstream comprises at least 20 wt % ring-containing. hydrocarbon compounds comprising aromatic moieties, naphthenic moieties or both.

5. The process of claim 1 wherein the platinum-containing zeolitic hydroisomerization catalyst.

6. The process of claim 1 wherein the hydroisomerization catalyst comprises platinum on a mixed SSZ-32 zeolite/alumina base.

7. The process of claim 1 wherein the hydrocarbon product has a net heat of combustion of greater than at least 128,000 Btu/gal.

8. The process of claim 1 wherein the hydrocarbon product has a net heat of combustion of greater than at least 130,000 Btu/gal.

9. The process of claim 1 wherein the feedstream comprises at least 60 wt % ring-containing hydrocarbon compounds.

* * * * *